(12) United States Patent
Goshgarian et al.

(10) Patent No.: US 11,629,449 B2
(45) Date of Patent: Apr. 18, 2023

(54) WASHING MACHINE

(71) Applicant: WHIRLPOOL CORPORATION, Benton Harbor, MI (US)

(72) Inventors: David P. Goshgarian, Saint Joseph, MI (US); Robert Jordan Rush, Norwalk, OH (US); Santosh Winfred, Bridgeman, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 93 days.

(21) Appl. No.: 17/409,942

(22) Filed: Aug. 24, 2021

(65) Prior Publication Data
US 2023/0060426 A1  Mar. 2, 2023

(51) Int. Cl.
*D06F 37/30* (2020.01)
*F16C 17/02* (2006.01)
*D06F 23/04* (2006.01)

(52) U.S. Cl.
CPC ............ *D06F 37/304* (2013.01); *D06F 23/04* (2013.01); *F16C 17/026* (2013.01); *F16C 2314/00* (2013.01)

(58) Field of Classification Search
CPC ..................................................... D06F 37/304
See application file for complete search history.

(56) References Cited

U.S. PATENT DOCUMENTS

| 2,976,746 A | 3/1961 | Flannery |
| 6,077,184 A | 6/2000 | Lee |
| 10,829,882 B2 | 11/2020 | Chupka |

FOREIGN PATENT DOCUMENTS

BR      202018077344 U2    7/2020

*Primary Examiner* — Jason Y Ko
(74) *Attorney, Agent, or Firm* — Brooks Kushman P.C.

(57) ABSTRACT

A washing machine includes a power source, a drum, and a transmission. The transmission is configured to deliver power from the power source to the drum. The transmission includes a housing, a shaft, and a bushing. The housing defines a cavity. The shaft is disposed within the cavity and is configured to receive power from the power source. The bushing is disposed about the shaft. The bushing defines grooves that establish fluid communication between the cavity and a space that is defined between an inner diameter of the bushing and an outer diameter of the input shaft.

20 Claims, 5 Drawing Sheets

WASHING MACHINE

TECHNICAL FIELD

The present disclosure relates to washing or laundry machines.

BACKGROUND

Washing machines are configured to clean clothes and other garments. Washing machines may include a power source that is configured to transfer power to an agitator or drum during a cleaning cycle.

SUMMARY

A washing machine includes a drum, an agitator, an electric machine, and a transmission. The agitator is disposed within the drum. The electric machine is configured to generate power to rotate the drum and agitator. The transmission is configured to deliver power from the electric machine to the drum or agitator. The transmission includes a housing, an input shaft, a bushing, and a seal. The housing defines an upper cavity and a lower cavity. The input shaft is configured to receive power from the electric machine, is disposed within the lower cavity, and extends upward into the upper cavity. The bushing is disposed within the lower cavity and about the input shaft. The bushing defines grooves that establish fluid communication between the upper cavity and a space that is defined between an inner diameter of the bushing and an outer diameter of the input shaft. The seal is disposed within the lower cavity, about the input shaft, and below the bushing.

A washing machine transmission includes a housing, an input shaft, an output shaft, a gearing arrangement, and a bushing. The housing defines a lower cavity and an upper cavity. The input shaft is configured to receive power from an electric machine, is disposed within the lower cavity, and extends upward into the upper cavity. The output shaft extends upward from the upper cavity. The output shaft is configured to deliver power to a drum or agitator. The gearing arrangement is disposed within the upper cavity and is configured to transfer power from the input shaft to the output shaft. The bushing is disposed within the lower cavity and about the input shaft. The bushing defines grooves that channel oil from the upper cavity into a space that is defined between the bushing and the input shaft.

A washing machine includes a power source, a drum, and a transmission. The transmission is configured to deliver power from the power source to the drum. The transmission includes a housing, a shaft, and a bushing. The housing defines a cavity. The shaft is disposed within the cavity and is configured to receive power from the power source. The bushing is disposed about the shaft. The bushing defines grooves that establish fluid communication between the cavity and a space that is defined between an inner diameter of the bushing and an outer diameter of the input shaft.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Illustrative washing machines in accordance with the present disclosure include a rotatable clothes mover or agitator and a rotatable basket or drum. Clothes movers generally oscillate, or rotate back and forth, in accordance with a stroke angle, to provide agitation to a laundry load during washing operations. Clothes movers and rotatable baskets generally spin together during spin cycle operations. To enable both of these functionalities, including oscillation by the clothes mover and joint spinning by the clothes mover and basket, a common drive system may be included. Such a drive system can include a drive mechanism or transmission for translating movement from an electric machine or motor into rotational movement of the basket and clothes mover by the use of a drive shaft that is operably coupled to a series of gears or gearing arrangement. Traditional drive mechanisms may include the use of a sun gear, a set of planetary gears, and an external ring gear. The planetary gears are often provided as spur gears. However, the gears may alternatively be helical gears in place of conventional spur gears in the drive mechanism. Traditional drive mechanisms, however, are not limited to planetary gear systems.

Figure 1:
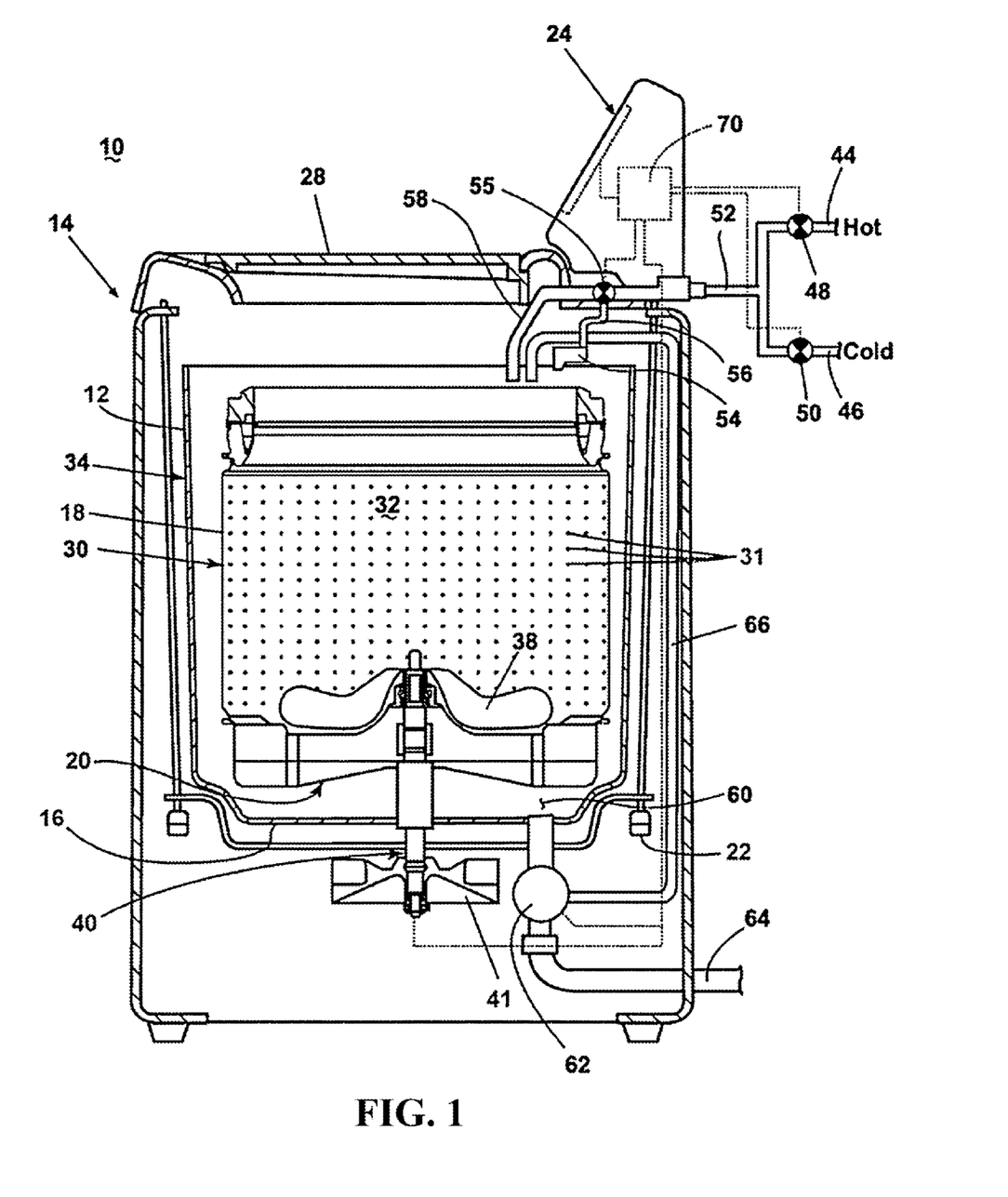
FIG. 1 illustrates a schematic cross-sectional view of a laundry treating appliance in the form of a washing machine according to an embodiment of the present disclosure.

FIG. 1 illustrates a schematic cross-sectional view of a laundry treating appliance shown in the form of a washing machine 10 according to one embodiment of the present disclosure. While the laundry treating appliance is illustrated as a vertical axis, top-fill washing machine, the embodiments of the present disclosure can have applicability in other fabric treating appliances, non-limiting examples of which include a combination washing machine and dryer, a refreshing/revitalizing machine, an extractor, or a non-aqueous washing apparatus.

Washing machines are typically categorized as either a vertical axis washing machine or a horizontal axis washing machine. As used herein, the "vertical axis" washing machine refers to a washing machine having a rotatable drum, perforate or imperforate, that holds fabric items and a clothes mover, such as an agitator, impeller, nutator, and the like within the drum. The clothes mover moves within the drum to impart mechanical energy directly to the clothes or indirectly through wash liquid in the drum. The clothes mover may typically be moved in a reciprocating rotational movement. In some vertical axis washing machines, the drum rotates about a vertical axis generally perpendicular to a surface that supports the washing machine. However, the rotational axis need not be vertical. The drum may rotate about an axis inclined relative to the vertical axis. As used herein, the "horizontal axis" washing machine refers to a washing machine having a rotatable drum, perforated or imperforate, that holds fabric items and washes the fabric items by the fabric items rubbing against one another as the drum rotates. In some horizontal axis washing machines, the drum rotates about a horizontal axis generally parallel to a surface that supports the washing machine. However, the rotational axis need not be horizontal. The drum may rotate about an axis inclined relative to the horizontal axis. In horizontal axis washing machines, the clothes are lifted by the rotating drum and then fall in response to gravity to form a tumbling action. Mechanical energy is imparted to the clothes by the tumbling action formed by the repeated lifting and dropping of the clothes. Vertical axis and horizontal axis machines are best differentiated by the manner in which they impart mechanical energy to the fabric articles. The illustrated exemplary washing machine of FIG. 1 is a vertical axis washing machine.

The washing machine 10 may include a structural support system comprising a cabinet 14 that defines a housing, within which a laundry holding system resides. The cabinet 14 may be a housing having a chassis and/or a frame defining an interior that receives components typically found in a conventional washing machine, such as electric machines (e.g., motors), pumps, fluid lines, controls, sensors, transducers, and the like. Such components will not be described further herein except as necessary for a complete understanding of the present disclosure. The top of the cabinet 14 can include a selectively openable lid 28 to provide access into the laundry treatment chamber 32 through an open top of the basket 30.

The fabric holding system of the illustrated exemplary washing machine 10 may include a rotatable drum or basket 30 having an open top that can be disposed within the interior of the cabinet 14 and may define a treating chamber 32 for receiving laundry items for treatment. A tub 34 can also be positioned within the cabinet 14 and can define an interior space or cavity within which the basket 30 can be positioned. The tub 34 can have a generally cylindrical side or tub peripheral wall 12 closed at its bottom end by a base 16 that can at least partially define a sump 60.

The basket 30 can have a generally peripheral side wall 18, which is illustrated as a cylindrical side wall, closed at the basket end by a basket base 20 to at least partially define the treating chamber 32. The basket 30 can be rotatably mounted within the tub 34 for rotation about a vertical basket axis of rotation and can include a plurality of perforations 31, such that liquid may flow between the tub 34 and the rotatable basket 30 through the perforations 31. While the illustrated washing machine 10 includes both the tub 34 and the basket 30, with the basket 30 defining the treating chamber 32, it is within the scope of the present disclosure for the laundry treating appliance to include only one receptacle, with the receptacle defining the laundry treatment chamber for receiving the load to be treated.

An agitator or clothes mover 38 may be disposed and rotatably mounted within the basket 30 to impart mechanical agitation to a load of laundry placed in the basket 30. The clothes mover 38 can be oscillated or rotated about its axis of rotation during a cycle of operation in order to produce load motion effective to wash the load contained within the treating chamber 32. Types of laundry movers include, but are not limited to, an agitator, a wobble plate, and a hybrid impeller/agitator.

The basket 30 and the clothes mover 38 may be driven by a drive system 40 that includes power sources, such as an electric machine or motor 41, and a transmission operably coupled with the basket 30 and clothes mover 38. The electric machine or motor 41 is configured to generate power to rotate the basket 30 and the clothes mover 38, and to oscillate the clothes more 38. The transmission is configured to deliver power from a power source (e.g., motor 41) to the basket 30 and/or the clothes mover 38. The transmission may include a gearing arrangement or gear case. The transmission may also include additional components such as input and output shafts. The motor 41 may rotate the basket 30 at various speeds in either rotational direction about the vertical axis of rotation, including at a spin speed wherein a centrifugal force at the inner surface of the basket side wall 18 is 1 g or greater. Spin speeds are commonly known for use in extracting liquid from the laundry items in the basket 30, such as after a wash or rinse step in a treating cycle of operation. A loss motion device or clutch can be included in the drive system 40 and can selectively operably couple the motor 41 with either the basket 30 and/or the clothes mover 38.

A suspension system 22 can dynamically hold the tub 34 within the cabinet 14. The suspension system 22 can dissipate a determined degree of vibratory energy generated by the rotation of the basket 30 and/or the clothes mover 38 during a treating cycle of operation. Together, the tub 34, the basket 30, and any contents of the basket 30, such as liquid and laundry items, define a suspended mass for the suspension system 22.

A liquid supply system can provide liquid, such as water or a combination of water and one or more wash aids, such as detergent, into the treating chamber 32. The liquid supply system may include a water supply configured to supply hot or cold water. The water supply may include a hot water inlet 44 and a cold water inlet 46, a valve assembly, which can include a hot water valve 48, a cold water valve 50, and a diverter valve 55, and various conduits 52, 56, 58. The valves 48, 50 are selectively openable to provide water, such as from a household water supply (not shown) to the conduit 52. The valves 48, 50 can be opened individually or together to provide a mix of hot and cold water at a selected temperature. While the valves 48, 50 and conduit 52 are illustrated as positioned on the exterior of the cabinet 14, it may be understood that these components may be internal to the housing.

As illustrated, a detergent dispenser 54 can be fluidly coupled with the conduit 52 through a diverter valve 55 and a first water conduit 56. The detergent dispenser 54 can include means for supplying or mixing detergent to or with water from the first water conduit 56 and can supply such treating liquid to the tub 34. It has been contemplated that water from the first water conduit 56 can also be supplied to the tub 34 through the detergent dispenser 54 without the addition of a detergent. A second water conduit, illustrated as a separate water inlet 58, can also be fluidly coupled with the conduit 52 through the diverter valve 55 such that water can be supplied directly to the treating chamber through the open top of the basket 30. Additionally, the liquid supply system can differ from the configuration shown, such as by inclusion of other valves, conduits, wash aid dispensers, heaters, sensors, such as water level sensors and temperature sensors, and the like, to control the flow of treating liquid through the washing machine 10 and for the introduction of more than one type of detergent/wash aid.

A liquid recirculation system may be provided for recirculating liquid from the tub 34 into the treating chamber 32. More specifically, a sump 60 can be located in the bottom of the tub 34 and the liquid recirculation system can be configured to recirculate treating liquid from the sump 60 onto the top of a laundry load located in the treating chamber 32. A pump 62 can be housed below the tub 34 and can have an inlet fluidly coupled with the sump 60 and an outlet configured to fluidly couple to either or both a household drain 64 or a recirculation conduit 66. In this configuration, the pump 62 can be used to drain or recirculate wash water in the sump 60. As illustrated, the recirculation conduit 66 can be fluidly coupled with the treating chamber 32 such that it supplies liquid into the open top of the basket 30. The liquid recirculation system can include other types of recirculation systems.

It is noted that the illustrated drive system, suspension system, liquid supply system, and recirculation and drain system are shown for exemplary purposes only and are not limited to the systems shown in the drawings and described above. For example, the liquid supply, recirculation, and pump systems can differ from the configuration shown in FIG. 1, such as by inclusion of other valves, conduits, treating chemistry dispensers, sensors (such as liquid level sensors and temperature sensors), and the like, to control the flow of liquid through the washing machine 10 and for the introduction of more than one type of treating chemistry. For example, the liquid supply system can be configured to supply liquid into the interior of the tub 34 not occupied by the basket 30 such that liquid can be supplied directly to the tub 34 without having to travel through the basket 30. In another example, the liquid supply system can include a single valve for controlling the flow of water from the household water source. In another example, the recirculation and pump system can include two separate pumps for recirculation and draining, instead of the single pump as previously described.

The washing machine 10 can also be provided with a heating system (not shown) to heat liquid provided to the treating chamber 32. In one example, the heating system can include a heating element provided in the sump to heat liquid that collects in the sump. Alternatively, the heating system can be in the form of an in-line heater that heats the liquid as it flows through the liquid supply, dispensing and/or recirculation systems.

The washing machine 10 may further include a controller 70 coupled with various working components of the washing machine 10 to control the operation of the working components and to implement one or more treating cycles of operation. The control system can further include a user interface 24 that is operably coupled with the controller 70. The user interface 24 can include one or more knobs, dials, switches, displays, touch screens and the like for communicating with the user, such as to receive input and provide output. The user can enter different types of information including, without limitation, cycle selection and cycle parameters, such as cycle options.

The controller 70 can include the machine controller and any additional controllers provided for controlling any of the components of the washing machine 10. For example, the controller 70 can include the machine controller and a motor controller. Many known types of controllers can be used for the controller 70. It is contemplated that the controller is a microprocessor-based controller that implements control software and sends/receives one or more electrical signals to/from each of the various working components to implement the control software. As an example, proportional control (P), proportional integral control (PI), and proportional derivative control (PD), or a combination thereof, a proportional integral derivative control (PID), can be used to control the various components of the washing machine 10.

Figure 2:
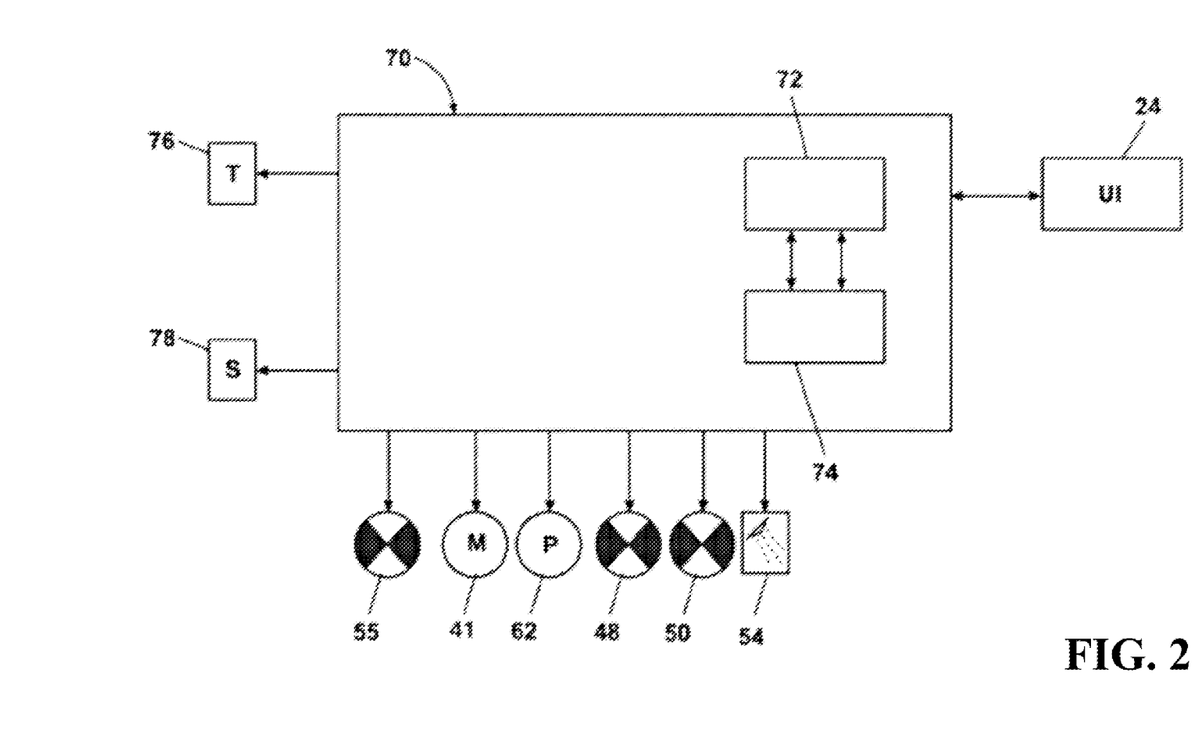
FIG. 2 illustrates a schematic representation of a controller for controlling the operation of one or more components of the laundry treating appliance of FIG. 1.

As illustrated in FIG. 2, the controller 70 can be provided with a memory 72 and a central processing unit (CPU) 74. The memory 72 can be used for storing the control software that can be executed by the CPU 74 in completing a cycle of operation using the washing machine 10 and any additional software. Examples, without limitation, of treating cycles of operation include: wash, heavy-duty wash, delicate wash, quick wash, pre-wash, refresh, rinse only, and timed wash, which can be selected at the user interface 24. The memory 72 can also be used to store information, such as a database or table, and to store data received from the one or more components of the washing machine 10 that can be communicably coupled with the controller 70. The database or table can be used to store the various operating parameters for the one or more cycles of operation, including factory default values for the operating parameters and any adjustments to them by the control system or by user input.

The controller 70 may be operably coupled with one or more components of the washing machine 10 for communicating with and/or controlling the operation of the components to complete a cycle of operation. For example, the controller 70 may be coupled with the hot water valve 48, the cold water valve 50, diverter valve 55, and the detergent dispenser 54 for controlling the temperature and flow rate of treating liquid into the treating chamber 32; the pump 62 for controlling the amount of treating liquid in the treating chamber 32 or sump 60; drive system 40 including motor 41 for controlling the direction and speed of rotation of the basket 30 and/or the clothes mover 38; and the user interface 24 for receiving user selected inputs and communicating information to the user. The controller 70 can also receive input from a temperature sensor 76, such as a thermistor, which can detect the temperature of the treating liquid in the treating chamber 32 and/or the temperature of the treating liquid being supplied to the treating chamber 32. The controller 70 can also receive input from various additional sensors 78, which are known in the art and not shown for simplicity. Non-limiting examples of additional sensors 78 that can be communicably coupled with the controller 70 include: a weight sensor, and a motor torque sensor.

While illustrated as one controller, the controller 70 may be part of a larger control system and may control or be controlled by various other controllers throughout the washing machine 10. It should therefore be understood that the controller 70 and one or more other controllers can collectively be referred to as a "controller" that controls various subcomponents or actuators of the washing machine 10 in response to signals from various subcomponents or sensors of the washing machine 10 to control various functions. The controller 70 may include the microprocessor or central processing unit (CPU) 74, which may be in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 70 in controlling the washing machine 10.

Figure 3:
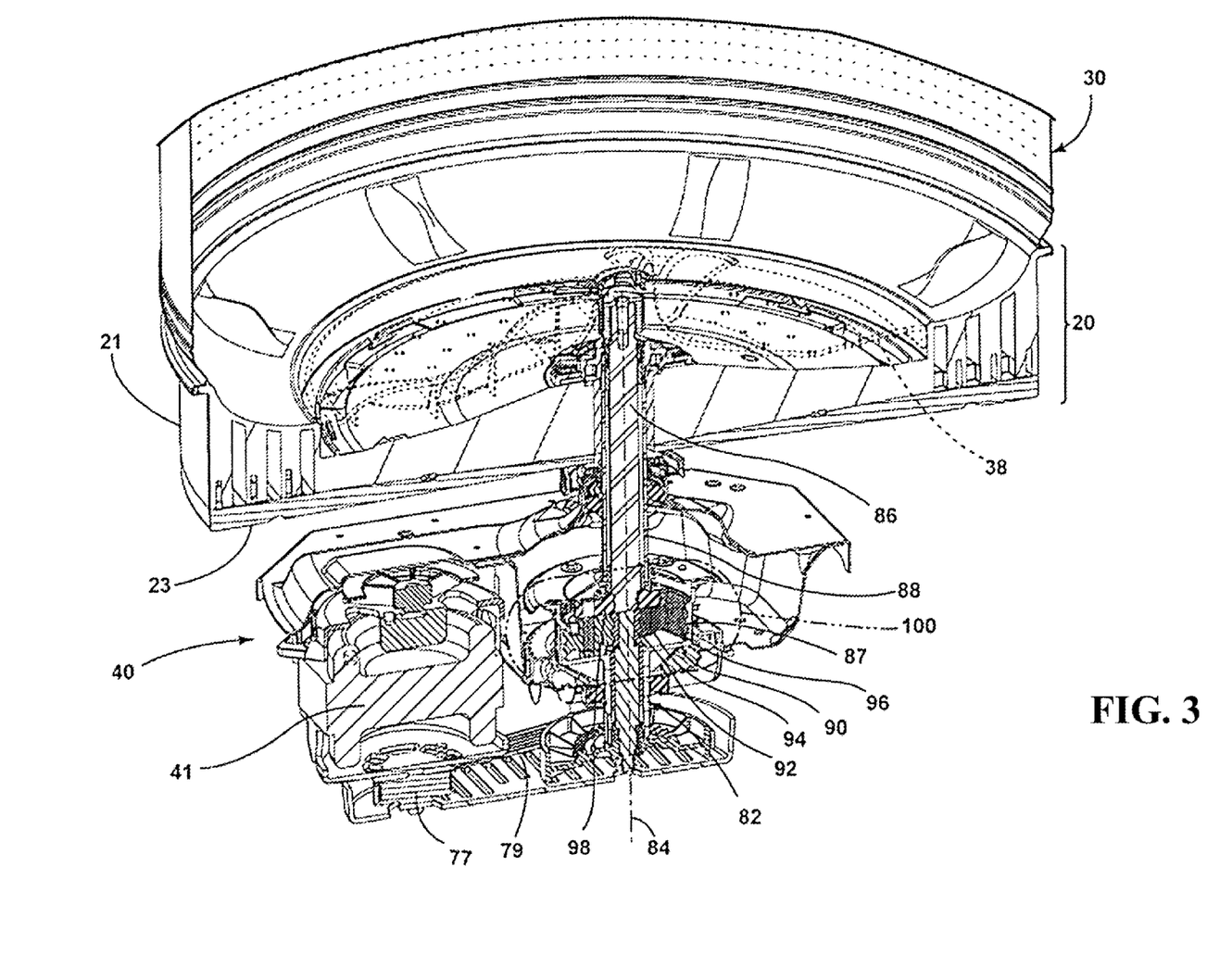
FIG. 3 illustrates a perspective cross-sectional view of a portion of a basket, clothes mover and drive system that can be included in the laundry treating appliance of FIG. 1 in accordance with the present disclosure.

FIG. 3 shows in greater detail a portion of the basket 30, clothes mover 38, and drive system 40. The motor 41 can be drivingly coupled to the clothes mover 38 to selectively oscillate or rotate the clothes mover 38. More specifically, the motor 41 can include an output 77 that is connected through a belt system 79 to a first drive shaft 82. The first drive shaft 82 is configured to receive power from the motor 41 and to rotate about an axis of rotation 84. Alternatively, the motor 41 could be directly connected to the first drive shaft 82. The first drive shaft 82 may be further connected to a second drive shaft 86 configured to couple with and rotate the clothes mover 38 and a third drive shaft, which is illustrated as a spin tube 88, configured to couple with and rotate the basket 30. As shown, the second drive shaft 86 can be concentric to, and positioned within the interior diameter of the spin tube 88. Each of the second drive shaft 86 and spin tube 88 can be configured to rotate, for example, independently of the other, in unison with the other, or at dissimilar rotational speeds or directions from the other.

The drive system 40 may further include a transmission 100 having a gear system or gearing arrangement, which can be provided within a gearbox 87. The gear system or gearing arrangement may be a planetary gear system or gearing arrangement. The gearbox 87 can include a gearbox housing 90, a sun gear 92, a set of planet gears 94, and an outer concentric ring gear 96, wherein the gears 92, 94, 96 are positioned within the housing 90. The gears may or may not be helical gears. It is also contemplated that the outer concentric ring gear 96 and the housing 90 can be provided as one piece wherein the housing 90 forms the outer concentric ring gear 96. The sun gear 92 is rotationally coupled with the first drive shaft 82, and includes teeth 92a configured to mesh with teeth 94a on the planet gears 94 and to rotate the set of planet gears 94. The planet gears 94 are positioned concentrically about the sun gear 92 and within the outer ring gear 96, such that the teeth 94a of planet gears 94 mesh with teeth 96a of the outer ring gear 96. Each of the planet gears 94 is coupled with a planet carrier 98 such that the rotation of the planet gears 94 about the ring gear 96, as driven by the sun gear 92, rotates the planet carrier 98 about the axis of rotation 84. The planet carrier 98 may be further coupled with the second drive shaft 86, which is configured to deliver power to the clothes mover 38 in order to rotate the clothes mover 38. The ring gear 96 may be operably connected with the basket 30 via the spin tube 88. The spin tube 88 is configured to deliver power to the basket 30 in order to rotate the basket 30. The sun gear 92, planet gears 94 and outer ring gear 96 can be collectively thought of as a gear system or gearing arrangement of the transmission 100, where the gear system or gearing arrangement is configured to deliver power from the to the first drive shaft 82 to the second drive shaft 86 and/or the spin tube 88. The first drive shaft 82 may be referred to as an input shaft of the transmission 100. The second drive shaft 86 and the spin tube 88 may be referred to as output shafts of the transmission 100.

The gearbox 87 can be configured in any suitable manner including that it can be configured in a speed-reducing configuration, for example by a gear reduction, such that the output rotational speed of the second drive shaft 86 is less than the rotational speed of the first drive shaft 82. The gearbox 87, sun gear 92, planet gears 94, ring gear 96, and the like, can be configured or selected to provide a desired rotational speed-reducing ratio based on the rotational speed of the first drive shaft 82, the desired rotational speed of the clothes mover 38, or the desired agitation of the washing machine 10 or the cycle of operation.

The motor 41 operates as controlled by the controller 70. The rotational speed of the first drive shaft 82 can be reduced by the planetary gearbox 87 and delivered to the clothes mover 38 to rotate the clothes mover 38, which ultimately provides movement to the laundry load contained within the laundry treating chamber 32. When the washing machine 10 is operating in the agitate mode, the motor 41 is operated in a reversing fashion which causes the first drive shaft 82 to oscillate, thus driving the sun gear 92 in alternating opposite directions. The clothes mover 38 is therefore oscillated through its connection with the planet gears 94. The wash basket 30 can be held stationary while the clothes mover 38 is oscillated, for example by means of a brake mechanism (not shown).

A clutch mechanism, which may be including within in the transmission 100, allows for switching the washing machine 10 between a mode in which the clothes mover 38 oscillates relative to the basket 30 and a mode in which the clothes mover 38 and the basket 30 rotate together. In exemplary implementations, the clothes mover 38 may oscillate during a wash cycle to provide agitation, and the clothes mover 38 and the basket 30 may spin together during a spin cycle.

Figure 4:
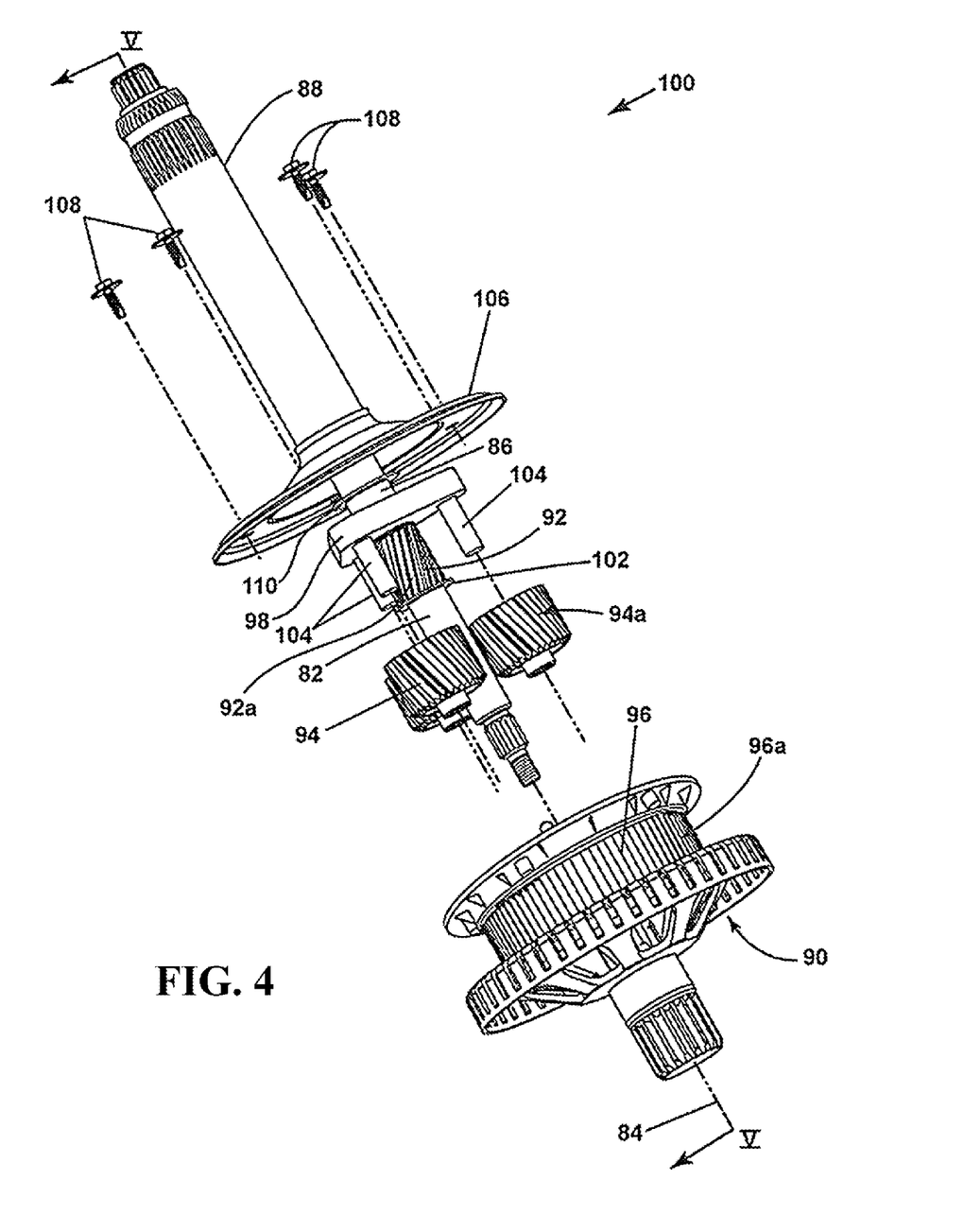
FIG. 4 illustrates an exploded view of a transmission, that can be utilized in the drive system of FIG. 3 according to a first embodiment of the present disclosure.

Turning now to FIG. 4, the transmission 100 is shown in enlarged and exploded detail. The transmission 100 may be used within a washing machine 10 having suitable capacity. In an exemplary embodiment, the transmission 100 may be used within a washing machine 10 having a low capacity tub 34. Non-limiting examples of such a low capacity can include tubs 34 having a volume of at least 3.5 cubic feet and not greater than 4.4 cubic feet.

The transmission 100 includes a thrust or input washer 102 that is disposed between the sun gear 92 and the housing 90, which defines the ring gear 96. The input washer 102 can be formed of any suitable material, non-limiting examples of which include metal or plastic. The planet gears 94 circumferentially surround the sun gear 92 and are received on a plurality of carrier posts 104 extending from the planet carrier 98. Planet carrier 98 is received about the second drive shaft 86. Above the planet carrier 98 and received about the spin tube 88 is an upper cover 106. The upper cover 106 can be secured to the housing 90 by a plurality of fasteners 108. The fasteners 108 can be any suitable type of fastener, including, but not limited to, screws, bolts, snap-in fasteners, etc. Between the planet carrier 98 and the upper cover 106 can be provided a carrier washer 110.

The plurality of teeth 92a of the sun gear 92 are provided about the outer circumferential surface of the sun gear 92. The plurality of teeth 94a of the planet gears 94 are provided about the outer circumferential surface of the planet gears 94. The teeth 94a of the planet gears 94 mesh with the teeth 92a of the sun gear 92. The plurality of teeth 96a of the ring gear 96 are provided about the inner circumferential surface of the ring gear 96. The teeth 96a of the ring gear 96 mesh with the teeth 94a of the planet gears 94. While the transmission 100 is illustrated herein as having three planet gears 94, it will be understood that any suitable number of planet gears 94 may be provided, including only a single planet gear 94. Further, in an exemplary embodiment, regardless of the number of planet gears 94 provided, the planet gears 94 may be equally spaced circumferentially around the sun gear 92 to reduce vibration in the transmission 100, and also in the washing machine 10 overall.

The carrier washer 110 provided between the planet carrier 98 and the upper cover 106 in the transmission 100 prevents contact between the planet carrier 98 and the upper cover 106, and may also or alternately dampen contact between the planet carrier 98 and the upper cover 106. The carrier washer 110 may be formed from any suitable material, such as a plastic or a resin. In an exemplary embodiment, the carrier washer 110 may be formed from or comprised of a plastic that is sufficiently durable to withstand the wear of normal operation of the drive system 40. One such example includes, but is not limited to, a polyetheretherketone (PEEK) based resin, which can be further provided with fillers such as nylon, a non-limiting example of which includes aramid, or a polytetrafluoroethylene, a non-limiting example of which includes Teflon™. The carrier washer 110 can have any suitable thickness such that the gap may be defined between the planet carrier 98 and the upper cover 106. It is further contemplated that carrier washer 110 can be any suitable thickness. By way of non-limiting example, each transmission 100 produced can be measured to determine the thickness of carrier washer 110 that is best suited in that individual transmission 100.

Figure 5:
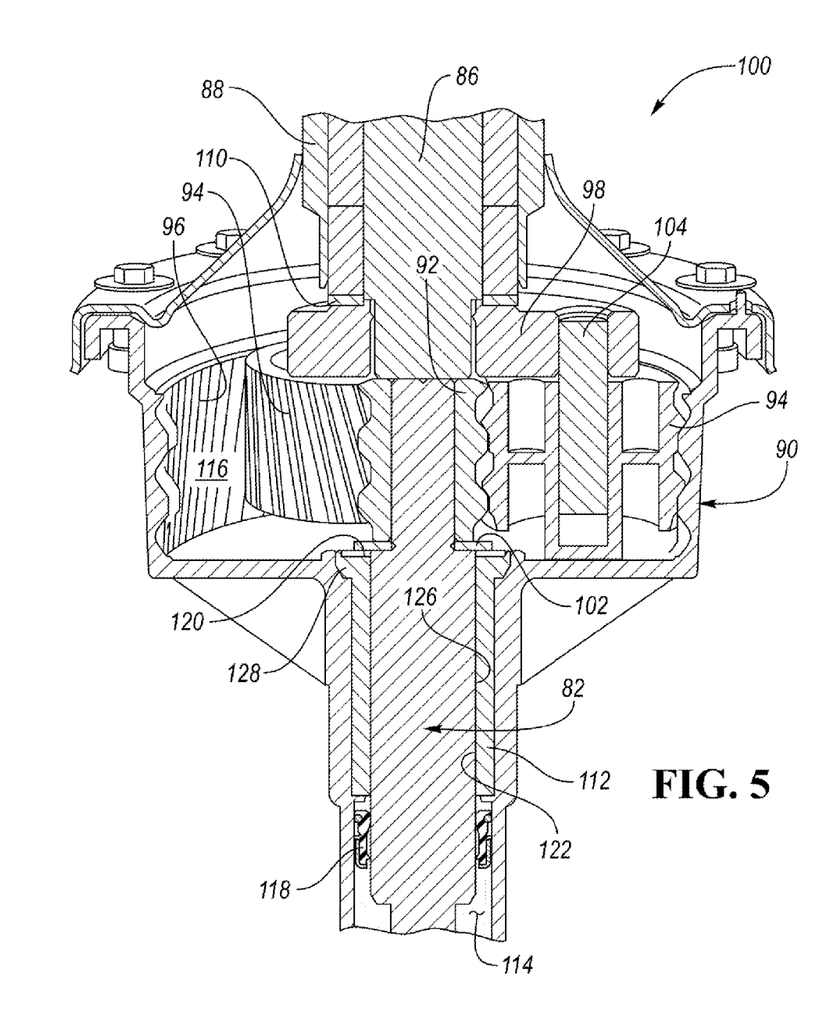
FIG. 5 illustrates a cross-sectional view of the transmission taken along line IV-IV in FIG. 4.
Figure 6:
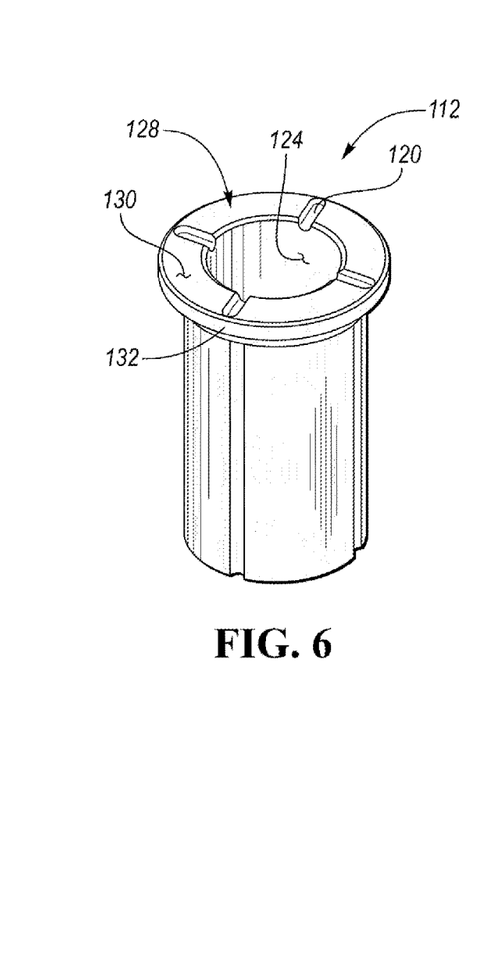
FIG. 6 is top isometric view of a bushing that is utilized in the transmission.

Referring now to FIGS. 5 and 6, the transmission 100 and a bushing 112 that is utilized in the transmission 100 are further illustrated. The housing 90 of the transmission 100 defines a lower internal space or cavity 114 and an upper internal space or cavity 116. An outer periphery or perimeter of the upper cavity 116 may be larger than an outer periphery or perimeter of the lower cavity 114. The first drive shaft 82 is disposed within the lower 114 cavity and extends upward into the upper cavity 116. The gear system or gearing arrangement, which may include the sun gear 92, planet gears 94, outer concentric ring gear 96, carrier 98, etc., is disposed within the upper cavity 116. The second drive shaft 86 and the spin tube 88 each extend upward from the upper cavity 116 and toward the basket 30 and clothes mover 38. A seal 118 (e.g., a rubber seal) is disposed within the lower cavity 114, about the first drive shaft 82, and below the bushing 112. The seal 118 is configured to prevent a lubricating fluid or oil from leaking out of the housing 90 along the bottom end of the housing 90. More specifically, the seal 118 is configured to prevent a lubricating fluid or oil from leaking out of lower cavity 114.

The bushing 112 is disposed within the lower cavity 114 and about the first drive shaft 82. The bushing 112 defines gutters or grooves 120 that establish fluid communication between the upper cavity 116 and a space 122 that is defined between an inner diameter 124 of the bushing and an outer diameter 126 of the first drive shaft 82. More specifically, the grooves 120 may be configured to channel oil from the upper cavity 116 into the space 122 that is defined between the inner diameter 124 of the bushing and the outer diameter 126 of the first drive shaft 82. Although four grooves are illustrated, the bushing 112 may define any number of grooves 120.

The bushing 112 may include a flange 128 that extends radially outward along a top end of the bushing 112. The grooves 120 may be defined along a top surface 130 of the flange 128. The top surface 130 of the flange 128 may face toward or into the upper cavity 116. The grooves 120 extend radially outward from the inner diameter 124 of the bushing 112 toward and an outer periphery or perimeter 132 of the flange 128. The grooves 120 may terminate prior to the outer perimeter 132 of the flange 128 (e.g., the grooves may start at the inner diameter 124 of the flange 128 but may not extend all the way to the outer perimeter 132 of the flange 128). The input washer 102 is disposed between the top of the bushing 112 and the gearing arrangement. More specifically, the input washer 102 may be disposed between the top surface 130 of the flange 128 and the sun gear 92. The input washer 102 may partially overlap the grooves 120.

Allowing oil to flow into the space 122 that is defined between the inner diameter 124 of the bushing and the outer diameter 126 of the first drive shaft 82 via the grooves 120 significantly reduces or eliminates the possibility of dry agitation between the first drive shaft 82 and the bushing 112, which could lead to increased wear of the parts and a decreased life of the transmission 100 and/or washing machine 10. Allowing oil to flow into the space 122 that is defined between the inner diameter 124 of the bushing and the outer diameter 126 of the first drive shaft 82 via the grooves 120 also reduces pumping pressure on the seal 118 with each agitation stroke, which significantly reduces or eliminates the possibility of oil from blowing downward and past the seal 118.

Compared to current designs, this design allows for a smaller diameter washer to be utilized as the input washer 102, which decreases material costs. Testing indicated that although such use of a smaller washer could increase the stress between the input washer 102 and the upper surface of the bushing 112 (i.e., the top surface 130 of the flange 128), the use of a smaller washer as the input washer 102 did not increase the endplay growth (e.g., the increase in endplay over time) relative to the current design, where the endplay growth was defined between the top of the first drive shaft 82/sun gear 92 and the bottom of the second drive shaft 86.

It should be understood that the bushing 112 may be utilized with any type of washing machine transmission and that the use of the bushing 112 is not limited to the particular transmission 100 described herein. Therefore, this disclosure should not be construed as being limited to transmission 100. It should further be understood that the designations of first, second, third, fourth, etc. for any component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A washing machine comprising:
   a drum;
   an agitator disposed within the drum;
   an electric machine configured to generate power to rotate the drum and agitator; and
   a transmission configured to deliver power from the electric machine to the drum or agitator, the transmission having,
   a housing defining an upper cavity and a lower cavity,
   an input shaft configured to receive power from the electric machine, disposed within the lower cavity, and extending upward into the upper cavity,
   a bushing disposed within the lower cavity and about the input shaft, wherein the bushing defines grooves that establish fluid communication between the upper cavity and a space that is defined between an inner diameter of the bushing and an outer diameter of the input shaft, and
   a seal disposed within the lower cavity, about the input shaft, and below the bushing.

2. The washing machine of claim 1, wherein the bushing has a flange that extends radially outward along a top end of the bushing.

3. The washing machine of claim 2, wherein the grooves extend radially outward from the inner diameter of the bushing toward and an outer perimeter of the flange.

4. The washing machine of claim 3, wherein a top surface of the flange faces into the upper cavity and where in the grooves are defined along the top surface.

5. The washing machine of claim 3, wherein the grooves terminate prior to the outer perimeter of the flange.

6. The washing machine of claim 1 further comprising (i) a gear disposed within the upper cavity and secured to an upper end of the input shaft and (ii) a thrust washer disposed between a top surface of the bushing and the gear.

7. The washing machine of claim 6, wherein the grooves are defined along the top surface and wherein the thrust washer partially overlaps the grooves.

8. A washing machine transmission comprising:
   a housing defining a lower cavity and an upper cavity;
   an input shaft configured to receive power from an electric machine, disposed within the lower cavity, and extending upward into the upper cavity;
   an output shaft extending upward from the upper cavity and configured to deliver power to a drum or agitator;
   a gearing arrangement disposed within the upper cavity and configured to transfer power from the input shaft to the output shaft; and
   a bushing disposed within the lower cavity and about the input shaft, wherein the bushing defines grooves that channel oil from the upper cavity into a space that is defined between the bushing and the input shaft.

9. The washing machine transmission of claim 8 further comprising a seal disposed within the lower cavity, about the input shaft, and below the bushing.

10. The washing machine transmission of claim 8, wherein the bushing has a flange that extends radially outward along a top end of the bushing.

11. The washing machine transmission of claim 10, wherein the grooves extend radially outward from the inner diameter of the bushing toward and an outer perimeter of the flange.

12. The washing machine transmission of claim 11, wherein the grooves terminate prior to the outer perimeter of the flange.

13. The washing machine transmission of claim 10, wherein a top surface of the flange faces into the upper cavity and where in the grooves are defined along the top surface.

14. The washing machine transmission of claim 8 further comprising a thrust washer disposed between a top surface of the bushing the gearing arrangement.

15. The washing machine transmission of claim 14, wherein the grooves are defined along the top surface and wherein the thrust washer partially overlaps the grooves.

16. The washing machine transmission of claim 8, wherein an outer perimeter of the upper cavity is larger than an outer perimeter of the lower cavity.

17. A washing machine comprising:
    a power source;
    a drum; and
    a transmission configured to deliver power from power source to the drum, the transmission having,
    a housing defining a cavity,
    a shaft disposed within the cavity and configured to receive power from the power source, and
    a bushing disposed about the shaft, wherein the bushing defines grooves that establish fluid communication between the cavity and a space that is defined between an inner diameter of the bushing and an outer diameter of the shaft.

18. The washing machine of claim 17, wherein the bushing has a flange that extends radially outward along an end of the bushing, and wherein the grooves are defined along a top surface of the flange.

19. The washing machine of claim 18, wherein the grooves extend radially outward from the inner diameter of the bushing toward and an outer perimeter of the flange.

20. The washing machine of claim 19, wherein the grooves terminate prior to the outer perimeter of the flange.

* * * * *